United States Patent
Ehrlund et al.

Patent Number: 6,032,795
Date of Patent: Mar. 7, 2000

[54] PACKAGE ASSEMBLY FOR KEEPING, STORING, DISPLAYING AND HANDLING DISC-SHAPED PRODUCTS

[75] Inventors: Åke Ehrlund, Spanga; Göran Lindblom, Vällingby, both of Sweden

[73] Assignee: Activation Sweden AB, Spanga, Sweden

[21] Appl. No.: 09/155,580

[22] PCT Filed: Mar. 21, 1997

[86] PCT No.: PCT/SE97/00489

§ 371 Date: Mar. 15, 1999

§ 102(e) Date: Mar. 15, 1999

[87] PCT Pub. No.: WO97/38919

PCT Pub. Date: Oct. 23, 1997

[30] Foreign Application Priority Data

Apr. 12, 1996 [SE] Sweden .................................. 9601380

[51] Int. Cl.$^7$ .................................................. B65D 85/57
[52] U.S. Cl. ........................ 206/312; 206/308.1; 206/232
[58] Field of Search ....................... 206/308.1, 309–313, 206/232

[56] References Cited

U.S. PATENT DOCUMENTS

| 5,088,599 | 2/1992 | Mahler | 206/308.1 |
| 5,421,452 | 6/1995 | Hybiske | 206/312 |
| 5,655,656 | 8/1997 | Gottlieb | 206/313 |
| 5,715,970 | 2/1998 | LeMaitre | 206/312 |
| 5,823,333 | 10/1998 | Mori | 206/312 |

Primary Examiner—Paul T. Sewell
Assistant Examiner—Luan K. Bui
Attorney, Agent, or Firm—Cowan, Liebowitz & Latman, P.C.; William H. Dippert

[57] ABSTRACT

A package assembly for keeping, storing, displaying and handling disc-shaped products, such as compact discs and the like, wherein the assembly is comprised of a sleeve or pocket that is produced by folding and/or gluing a first paperboard or cardboard-like blank, and a slide or tray which is intended to removably receive at least one disc-shaped product and which is produced by folding and/or gluing a second paperboard or cardboard-like blank, wherein the sleeve has an opening through which the product-carrying slide can be inserted and withdrawn, wherein the slide includes product-constraining means, and wherein the sleeve and the slide include mutually coacting means which function to maximize the extent to which the slide can be withdrawn from the sleeve for the removal and insertion of a product into the space intended therefor. According to the invention, a folded part of the slide in the region of its bottom part functions both as a part of a product-receiving pocket and as a partition wall that enables two products to be received in mutually parallel and mutually separated relationship, wherein the folded part includes a separate foldable flap that forms a bottom abutment for products received on respective sides of the partition wall, wherein the bottom abutment of said flap also functions to restrict the extend to which the slide can be withdrawn from the sleeve.

10 Claims, 3 Drawing Sheets

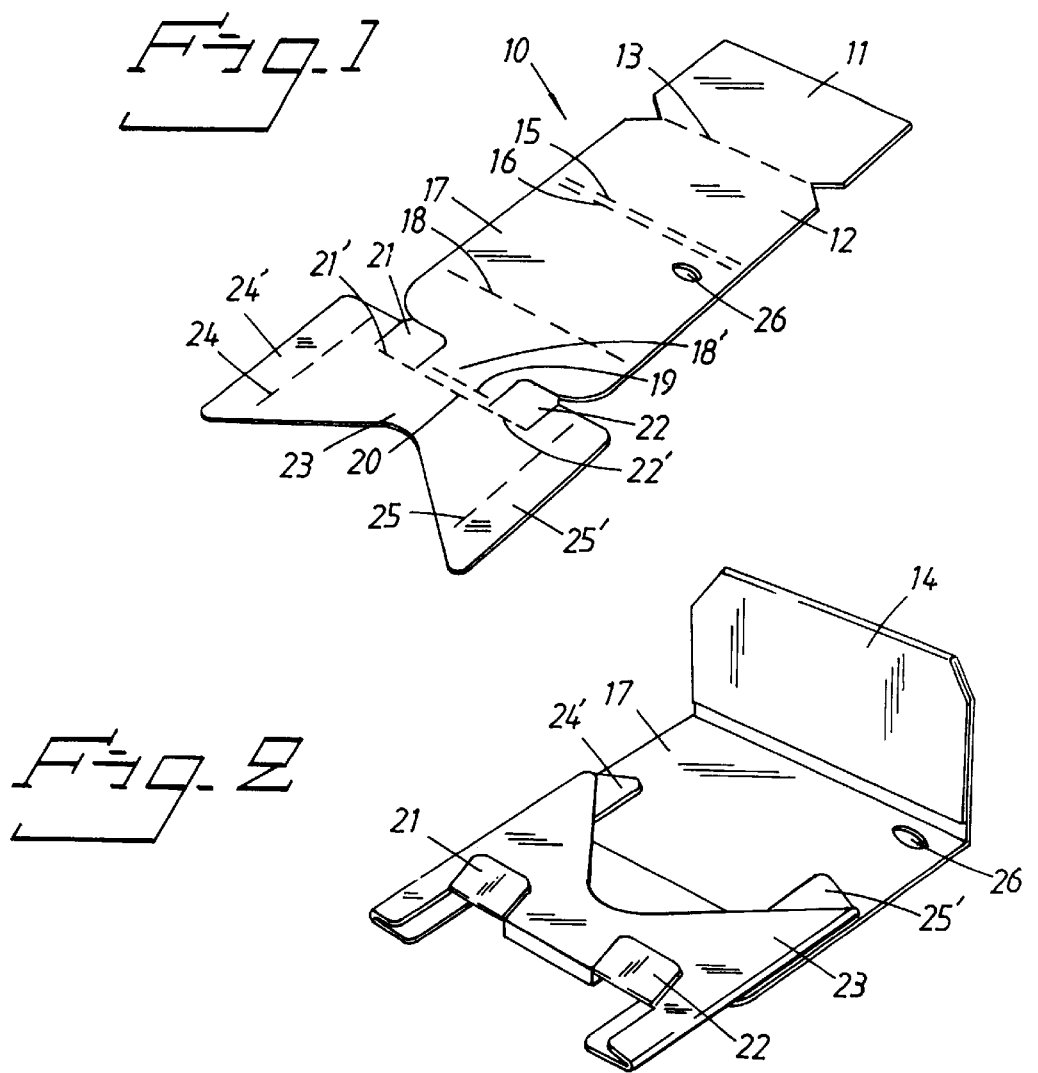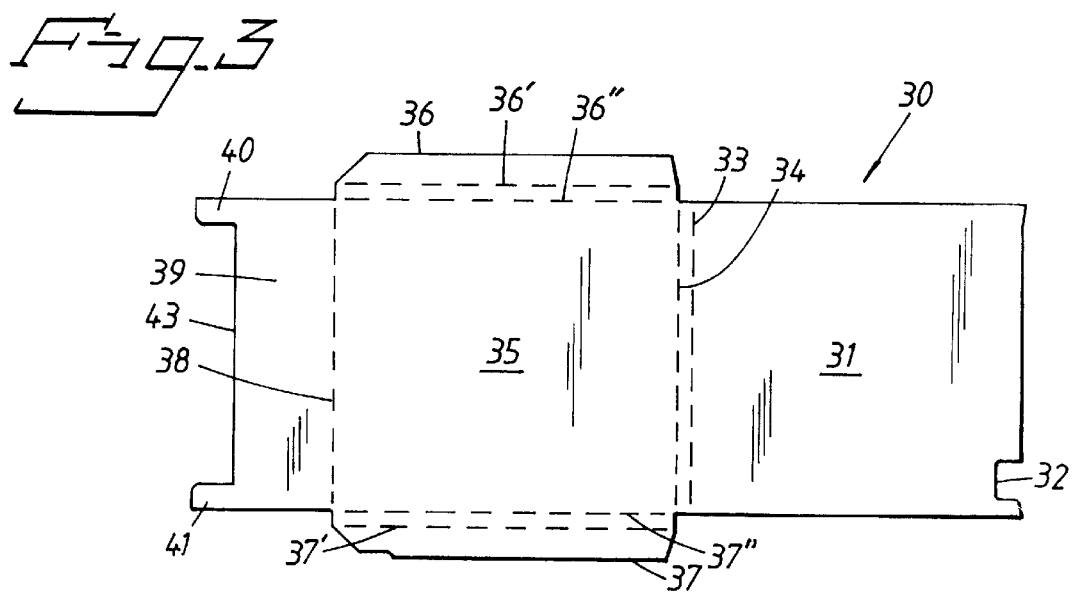

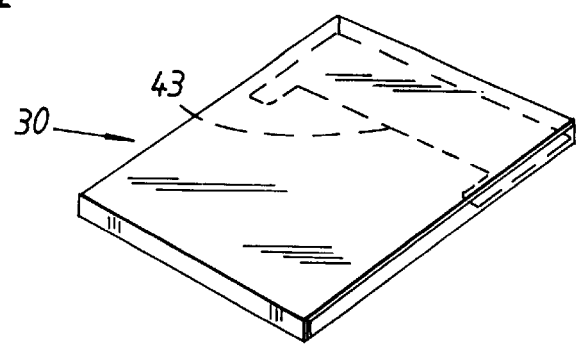
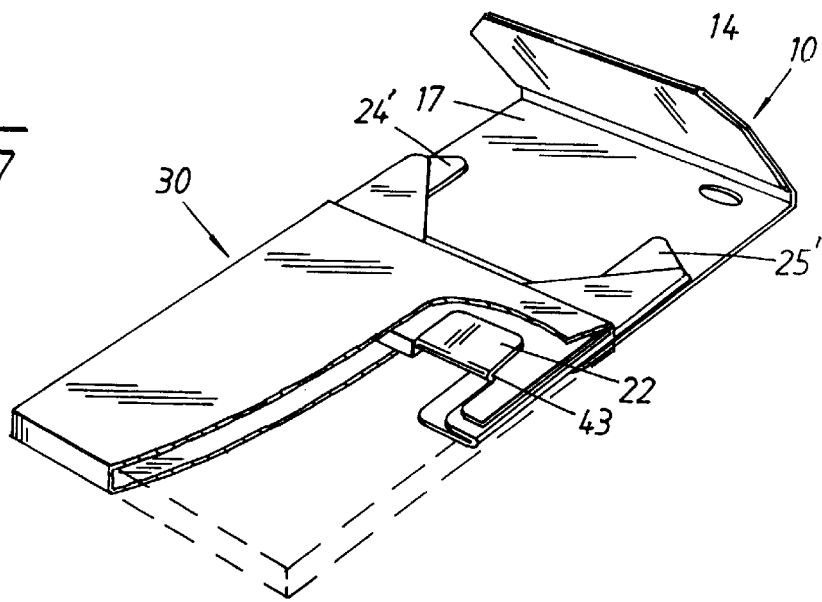
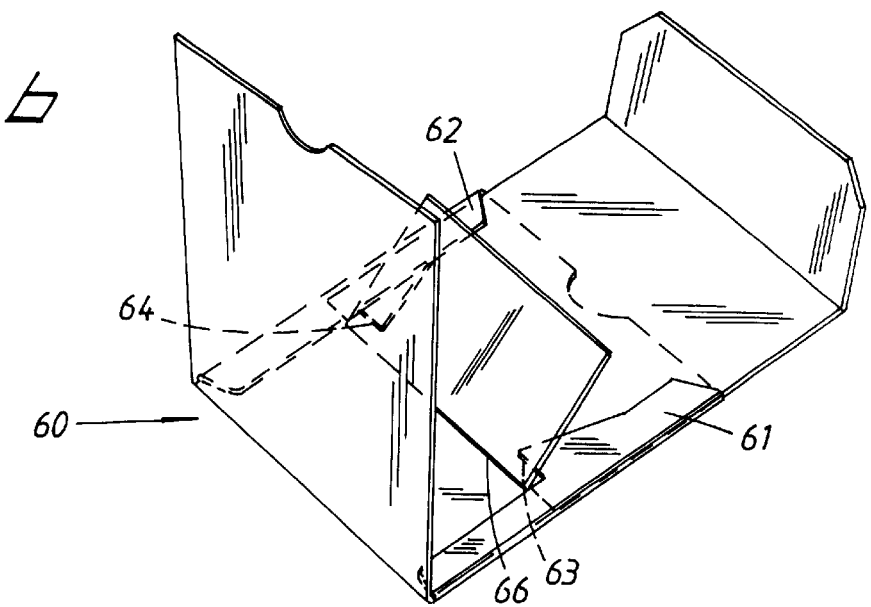

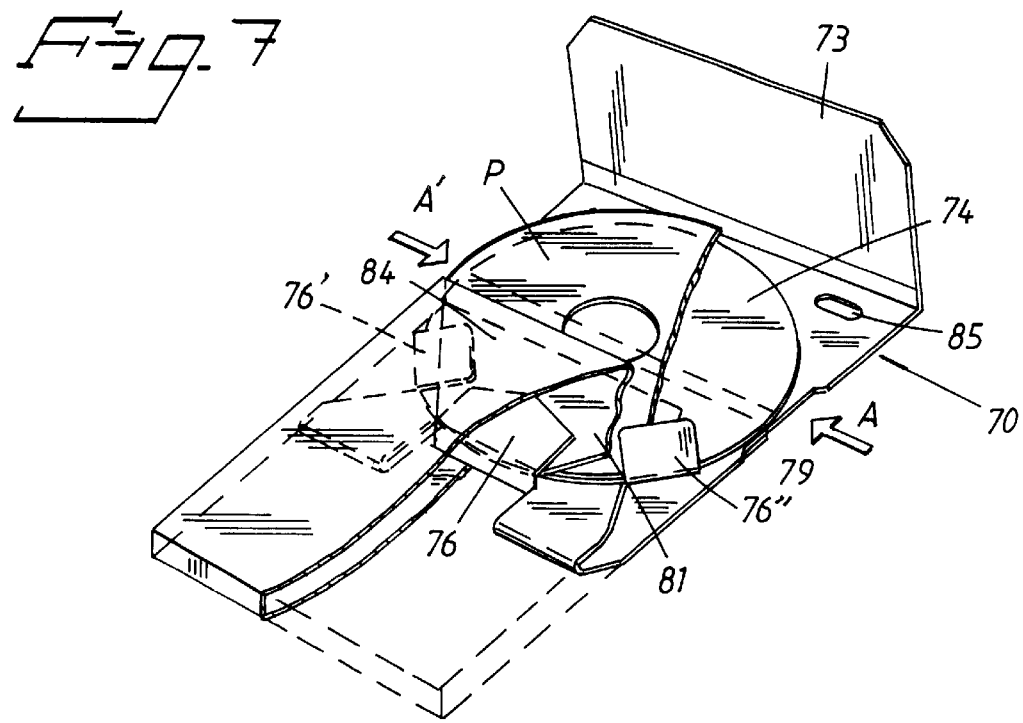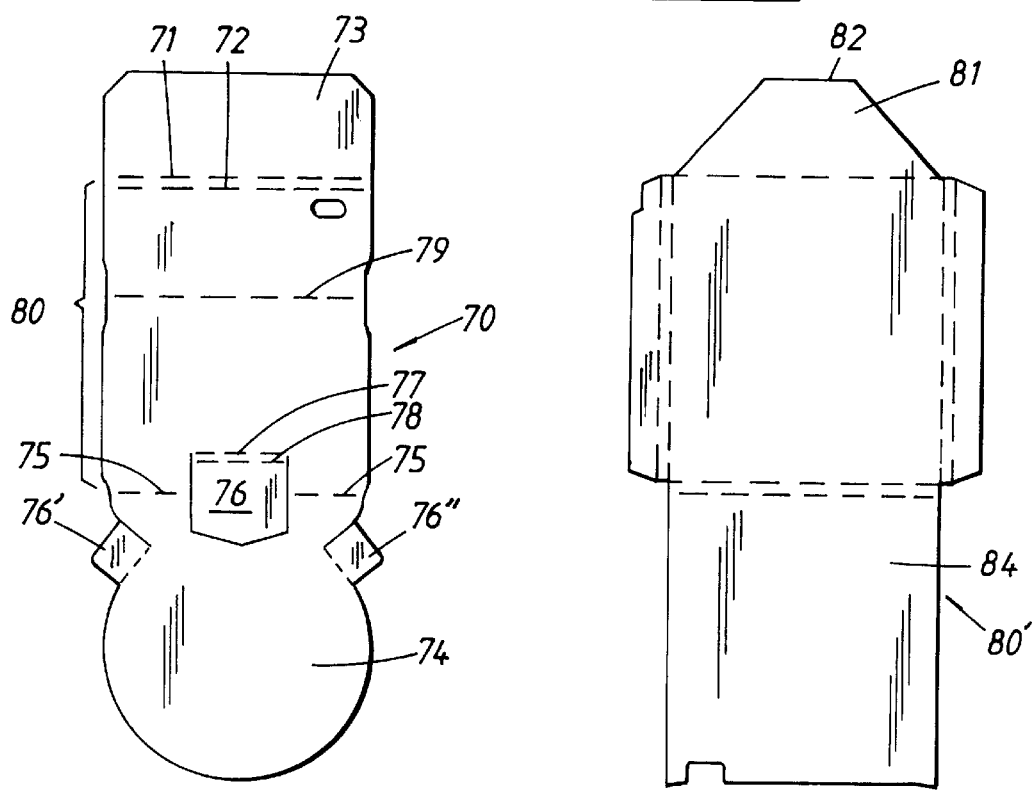

PACKAGE ASSEMBLY FOR KEEPING, STORING, DISPLAYING AND HANDLING DISC-SHAPED PRODUCTS

FIELD OF INVENTION

The present invention relates to a package assembly for keeping, storing, displaying and handling disc-shaped products, such as compact discs and the like, wherein the assembly is comprised of a sleeve or pocket that is produced by folding and/or gluing a first paperboard or cardboard-like blank, and a slide or tray which is intended to removably receive at least one disc-shaped product and which is produced by folding and/or gluing a second paperboard or cardboard-like blank, wherein the sleeve has an opening through which the product-carrying slide can be inserted and withdrawn, wherein the slide includes product-constraining means, and wherein the sleeve and the slide include mutually coacting means which function to maximize the extent to which the slide can be withdrawn from the sleeve for the removal and insertion of a product into the space intended therefor.

BACKGROUND IF THE INVENTION

U.S. Pat. No. 5,421,452 teaches a case of the kind defined in the preamble of the main claim. This known case includes a product-carrying tray or slide that can be inserted into a sleeve or pocket section. The extent to which the slide can be withdrawn from the sleeve is restricted by mutually coacting stop members on the slide and the sleeve. Both the construction and the use of this known case have disadvantages. In order to enable a package assembly to be mass-produced at favourable costs, it is necessary to be able to produce the component parts of the assembly in an automatic machine as far as possible. The known assembly has a complex construction and the production costs of each assembly are apparently very high. Certain drawbacks are also revealed when using the known disc assembly. Normal handling of a package assembly of this kind involves the user gripping the assembly between the thumb and index finger of one hand while pressing towards respective opposing side edges of the assembly and holding the assembly firmly while withdrawing the slide from the sleeve with the other hand. The grip between thumb and index finger causes the sleeve to flex outwards towards the surface that faces towards the viewer, thereby causing side flaps on the slide to slip over and past the stop members on the sleeve, such as to allow the slide to be withrawn beyond its intended limit. If the disc assembly is held in a position other than flat, there is also the danger that the product will fall out of the sleeve/slide and be damaged in the process. The slide of the known package assembly can only accommodate one product, and hence that part of the assembly sleeve that functions as a lid is configured as a pocket in which printed information can be stored, for instance.

The sleeve is provided with a cover flap which is folded into abutment with another sleeve surface. Because of the inherent resiliency of the material used, the cover flap tends to spring out and therewith make it difficult to store the package assembly, unless the cover flap is secured to another sleeve surface in some way or another.

SUMMARY OF THE INVENTION

The present invention relates to a package assembly of the kind defined in the introduction and having the features set forth in the characterizing clause of claim 1.

A package assembly of this kind has many advantages in relation to known package assemblies. For instance, the slide partition panel formed by the bottom part of the blank enables two products to be placed in the slide while mutually separated by said partition panel. The flap that is formed partially from the partition panel functions as a bottom abutment for products that are placed on respective sides of said partition wall. When folded, i.e. when extending the slide upwards along the surface of the partition wall that faces towards the viewer, the bottom of the flap will be present on both sides of the partition wall. Because the flap strives to lie against the internal surface of the sleeve that faces towards the viewer and also functions as that part of the slide which coacts with means bent in the upper sleeve part, the flap will never be able to slide beneath and past said means and will therewith ensure that the extent to which the slide can be withdrawn from the sleeve will always be limited maximum, although to an extent that will enable the user to grip one and/or the other of said products and remove the same from the slide, or conversely return one and/or the other product to the intended space in the slide, whereafter the cover part is folded down and the slide inserted as a unit into the sleeve. Because the sleeve has no cover member, the inventive package assembly can be easily stored in existing storage racks. Other features of the inventive package assembly, particularly with respect to the configuration of the slide and sleeve, will be evident from the following depending claims.

BRIEF DESCRIPTION OF THE DRAWINGS

In order that the invention will be more readily understood and further features thereof made apparent, the invention will now be described with reference to the accompanying drawings, in which FIG. 1 illustrates a prepared paperboard blank from which there is fabricated a first part of the inventive package assembly, i.e. the slide;

FIG. 2 illustrates a slide that has been fabricated from the blank of FIG. 1 by folding/gluing and that is in a state ready to receive a disc-shaped product;

FIG. 3 illustrates a prepared paperboard blank from which there is fabricated a second part of the inventive package assembly, i.e. the sleeve;

FIG. 4 illustrates a sleeve that has been fabricated by bending/gluing the blank in FIG. 3 and which is ready to receive and coact with the slide shown in FIG. 2;

FIG. 5 illustrates the slide and the sleeve according to FIGS. 14 in a mutually cooperating state in which the slide is inserted fully into the sleeve;

FIG. 6 is a perspective view of a second embodiment of an inventive package assembly comprising a slide and a sleeve;

FIG. 7 illustrates a further embodiment of the inventive package assembly.

FIG. 7*a* illustrates a slide of the embodiment of the inventive package assembly of FIG. 7; and FIG. 7*b* illustrates a sleeve of the embodiment of the inventive package assembly of FIG. 7.

Shown in FIG. 1 is an inventive package assembly which includes a slide, generally indicated by reference numeral 10, said slide constituting one of two major component parts of the novel package assembly. The slide 10 is fabricated from an elongated paperboard blank that includes a first panel 11 and a second panel 12 that are intended to be folded along the transverse folding line 13 and then glued together to form a panel 14 (FIG. 2) of double thickness. (The panel 14 may, of course, be of single thickness). The panel 14 is intended to form a slide cover member, as described hereinafter. There next follows two mutually spaced and mutually parallel fold lines 15, 16. The distance between the fold lines 15, 16 defines the thickness of the fabricated slide 10. There next follows a panel 17 from which the rear side of the pocket-like slide 10 is formed and against which the disc-shaped product (not shown) lies. The panel 17 can be folded rearwardly about a fold line 18, as explained in more detail below. The lower part of the panel 17 is terminated in a centre flap 18, wherein two mutually parallel and mutually spaced fold lines 19, 20 define the thickness of the slide bottom against which the disc-shaped product rests. Flaps 21 and 22 are cut out on respective sides of the centre flap 18 and can each be folded along a respective fold line 21' and 22' that forms a continuation of the lower fold line 20. There then follows a recess lowermost 23. Subsequent to folding the blank, two longitudinally extending fold lines 24, 25 on respective sides of the panel 23 will define together with the folded panel 23 an upwardly open pocket-like space (FIG. 2) in which the disc-shaped product is placed. The cut-out or recess in the panel 23 enables the disc-shaped product to be gripped without touching any sensitive part of the product, e.g. the sensitive surface of a compact disc. The flaps 24', 25' thus form slide side-walls and slide guides.

FIG. 2 shows a slide 10 that has been fabricated in the aforedescribed manner. It will be noted that the opening 26 provided in the panel 17 functions as a finger grip when withdrawing the slide 10 from the sleeve to said restricted maximum extent, as explained in more detail hereinafter.

The aforedescribed slide 10 is intended to cooperate with the sleeve of the novel package assembly. The sleeve will now be described with reference to FIGS. 3 and 4.

Shown in FIG. 3 is an elongated paperboard blank, generally indicated at reference numeral 3, from which there is fabricated an upwardly open sleeve that coacts with the slide 10. The blank 30 has a first panel 31 that defines a first closure part that may include a recessed upper edge part or a notch cut into said edge part (at 32). The thickness of the folded slide-receiving sleeve 30 is defined by two transverse and mutually parallel fold lines 33, 34. A second panel 35 forms a second closure part and has mutually opposite and outwardly projecting flap parts 36, 37. Each of the flap parts 36, 37 has two mutually parallel and mutually spaced fold lines 36', 36" and 37', 37" respectively, such as to form upstanding surfaces S. The flaps or guides 40, 41 on the panel 39 will then be located beneath the surfaces S. In stage 3, the panel 31 is folded along the fold lines 33, 34 and glued to the surfaces S. Folding of the panel 31 results in a sleeve 11 that is open solely upwards. FIG. 4 shows in broken lines the folded state of the panel 39, whose transverse edge part 43 is adapted to form a stop or restricting abutment.

FIGS. 2 and 4 illustrate a fabricated slide 10, intended to accommodate the disc-shaped product in the aforedescribed manner, and a sleeve 30. As before mentioned, the slide is secured in the sleeve in a manner which allows the slide to be withdrawn only to a limited maximum extent. The Figures clearly show the coaction between slide 10 and sleeve 30 and illustrate the manner in which the mutually coacting locking or latching means between the upstanding flaps 21, 22 of the slide 10 and the abutment edge 43 of the sleeve enable the slide 10 to be withdrawn from the sleeve to only a limited extent. It will be noted that the fold line 18 on the slide 10 (FIG. 1) is provided to enable the panel 17 to be folded back to facilitate removal of the product.

FIG. 5 is a perspective and partially broken view that illustrates the slide 10 in its maximum withdrawal position in relation to the sleeve 30, and it will be evident from the aforegoing that both the slide 10, i.e. the pocket-like part of the novel package assembly in which the disc-shaped product rests, and the slide-embracing sleeve 30 are so configured that the package assembly (with the slide 10 inserted in the sleeve 30) will present two opposite large surfaces and four narrow side or edge surfaces, on which selected information/means of identification may conveniently be printed or otherwise applied. For instance, when the products are to be displayed for sale upstanding in a sales rack, one upwardly facing edge surface of the package can be provided with any desired information relating to the contents of the package, so as to enable the package to be identified quickly without needing to make other time-consuming searches.

An inventive package assembly may readily be constructed to enable the slide 10 to accommodate, for instance, two disc-shaped products. In this case, the slide 10 is provided with a permanent or removable partition wall that separates two such products one from the other. The thickness of the slide 10 and the sleeve 30, i.e. the distance between the fold lines 15, 16 (FIG. 1) and the fold lines (33, 34; 36'; 37', 37" (FIG. 3) is determined with respect to whether the slide 10 shall accommodate one or more products. The space shall also accommodate an information sheet describing the contents of the product. It will also be evident from the drawings that when the slide 10 is withdrawn to said maximum extent from the sleeve 30, the disc-shaped product will be exposed to an extent corresponding preferably to half its diameter and can then be removed from the slide, either by gripping the edges of the product between thumb and index finger of one hand, or by bending down the panel 17 in the slide 10 and gripping the product at its centre.

FIG. 6 illustrates a second embodiment of the inventive package assembly, in which the inwardly bent mutually opposing flaps 61, 62 of the sleeve 60 have mutually opposing abutment edges 63, 64. These abutment edges 63, 64 have the same function as the abutment edge 43 of the sleeve 30 illustrated in FIG. 3, for instance. In the modified version shown in FIG. 6, the slide 10 has a foldable pocket-part 65, wherein the outer edges of the folded part (at 66) abut the abutment edges 63, 64 and thus allow the slide to be withdrawn from the sleeve solely to only a limited extent. The principle, however, is the same as the principle of the FIG. 5 embodiment for instance, i.e. that slide and sleeve shall include mutually coacting latching means. The edges 61, 62 of the sleeve 60 function as side guides for a product placed in the slide 10. This embodiment has been included to show that the latching arrangement between slide and sleeve that functions to allow the slide to be withdrawn from the sleeve solely to a limited extent can also be achieved in ways other than through the medium of flaps and abutment edges according to FIGS. 1-5.

FIGS. 7, 7a and 7b illustrate a further embodiment of a package assembly for compact discs or like products, comprising a prepared first sheet-like blank comprised of cardboard, paperboard or some equivalent material, which is useful in the fabrication of a product-receiving slide (FIG. 7a), and a prepared second sheet-like blank comprised of cardboard, paperboard, or some equivalent material, that is useful in fabricating a slide-receiving sleeve 80' (FIG. 7b). FIG. 7 illustrates that folding of the blank will result in a slide 70 which is capable of receiving at least one product P. FIG. 7 illustrates the case in which the slide 70 is withdrawn to its maximum extent from the sleeve 80' that has been fabricated by folding the blank shown in FIG. 7b, such as to provide access to the product P.

Similar to the earlier embodiments, the slide 70 and the sleeve 80' are fabricated by folding/gluing the respective prepared blanks shown in FIGS. 7a and 7b.

The first sheet-like blank (the slide) 70 includes in the upper part (FIG. 7a) a part 73 (single or double thickness material) that serves as a cover member and that is foldable along mutually parallel and transversely extending fold lines 71, 72. The blank 70 (FIG. 7a) is prepared so as to provide a lower panel 74 for forming a product storage space (FIG. 7). The lower panel 74 has a preferably rounded lower edge part that is delimited upwardly by a transverse fold line 75. The blank 70 (FIG. 7a) also includes a panel 80 that is located above the panel 74 as seen in the plane of the drawing and that is delimited downwardly by fold lines 75 and upwardly by a fold line 79, this latter fold line 79 constituting a lower limitation of a further panel that is delimited upwardly by the aforesaid double fold lines 71, 72. A flap 76 is cut out of the blank 70 (FIG. 7a) on three sides thereof, and extends from the panel 74 into the panel 80 located thereabove. The flap 76 is foldable along mutually parallel and mutually spaced transverse fold lines 77, 78 located in the panel 80. The fold line 75 thus extends transversely across the flap 76. When folding the panel 74 upwards, the panel will be orientated parallel with the panel 80, whereafter the flap 76 is folded along the fold lines 77, 78 and orientated so as to extend approximately centrally along the front surface of the folded panel 74 (FIG. 7).

When the first sheet-like blank 70 is folded in the aforedescribed manner, the panel 74 will form a wall that partions respective pockets formed on each side thereof, the common bottom of both pockets being defined by the fold lines 77, 78 of the flap 76. This will be evident from FIG. 7. In the package assembly exemplified in FIG. 7, a product P, e.g. a compact disc, is placed so as to lie against the surface of the panel 75 which faces towards the viewer, wherewith the bottom part of the product P will lie against that part of the bent flap 76 which is defined by the fold lines 77, 78 and which serves as a bottom surface. However, since these fold lines 77, 78 also serve as a bottom abutment, the other pocket defined by the surface of the panel 74 distal from the viewer and the rearwardly lying panel 80 in the slide 70 will also be able to removably receive a second product (not shown), which is thereby separated from the first product P that faces towards the viewer. This second product may either comprise printed information relating to the first product or may be a second disc-shaped product.

In order to support the product P laterally and to prevent the product from moving sideways as a result of play that may occur between sleeve and slide, the panel 74 includes mutually opposing flaps 76', 76" that in the folded state of the panel 74 will flank the central flap 76 and therewith form product side supports (see FIG. 7), which thus have three abutment surfaces, namely the bottom abutment edge of the flap 76 and the two flanking side flaps 76', 76". When the product P, or the product P and a further product, is/are placed on one side or a respective side of the partition wall (the folded panel 74), the cover member 73 is folded down and the slide and its contents are now ready for insertion into the sleeve, as hereinafter described in more detail.

The aforedescribed slide 70 is intended to coact with a sleeve that has been fabricated from a prepared, elongated paperboard blank 80' (FIG. 7b). The blank 80' is, in principle, composed in the same manner as in the earlier described embodiments (c.f., for instance, FIG. 3) and is folded/glued so as to form an upwardly open sleeve, wherein the panel 81 shown in FIG. 7b, particularly the edge part 82 of said panel will form, when folded, a stop means that limits the extent to which the slide 70 can be withdrawn from the sleeve 80', as described in more detail below.

Subsequent to having inserted the slide 70 and its contents into the sleeve 80', there is obtained a generally rectangular package. As shown in FIG. 7, a finger grip 85 is provided for limited withdrawal of the slide 70 from the sleeve 80'. As the slide 70 is withdrawn from the sleeve 80', the inwardly folded panel 81 of the sleeve 80', and then particularly the bottom edge part 82 of said panel, is guided in between the product P and the folded flap 76 and caused to lie against the same bottom abutment surface as that against which the product P abuts. The panel 81 has a frusto-conical shape and consequently its sloping side edges will slide in beneath the side flaps 76', 76" that flank the flap 76 and therewith further ensure that the slide can only be withdrawn from the sleeve 80' to a maximum limited extent. FIG. 7 thus shows the slide 70 withdrawn to its limited maximum extent from the sleeve 80' and it will be seen that the outer periphery of the product P will then project slightly beyond the rounded periphery of the panel 74, so as to enable the product P to be gripped between the thumb and index finger of one hand (the arrows A, A') and removed from the slide 70 with the other hand. If required, the panel 81 of the slide 70 can be flexed rearwardly above the fold line 79 so as to provide a better grip on the product.

It will be noted that although the inherent springiness of the flap 76 on the slide 70 causes the flap to strive to move upwards, the flap will be pressed back by the front-wall panel 84 of the sleeve 80'. This ensures the aforedescribed latching engagement between the flap bottom 77, 78 of the slide 70 and the edge 82 of the sleeve for maximum withdrawal of the slide 70.

As will be understood by one skilled in this art, variants of this last described embodiment are conceivable. For instance, the folded flap 76 on the slide 70 may be longer in its transversal direction than the flap illustrated in FIG. 7. It is also conceivable to provide two such flaps 76, in that case the abutment part 82 must, of course, be configured in a manner adapted thereto.

It will also be understood by the person skilled in this art that the invention is not restricted to the aforedescribed and illustrated embodiments and that modifications can be made within the scope of the following claims.

We claim:

1. A package assembly for keeping, storing, displaying and handling disc-shaped products, wherein the assembly is comprised of a sleeve that is produced by fabricating a first paperboard blank, and a slide to removably receive at least one disc-shaped product and which is produced by fabricating a second paperboard blank, wherein the sleeve has an opening through which the product-carrying slide can be inserted and withdrawn, wherein the slide includes product-constraining flaps, and wherein the sleeve and the slide mutually function to maximize the extent to which the slide can be withdrawn from the sleeve for the removal and insertion of said product into the space intended therefor, characterized in that a folded part of the slide in the region of its bottom part functions both as a part of a product-receiving pocket and as a partition wall that enables two products to be received in mutually parallel and mutually separated relationship, wherein the folded part includes a separate foldable first flap that forms a bottom abutment for products received on respective sides of the partition wall, wherein the bottom abutment of said first flap also functions to restrict the extent to which the slide can be withdrawn from the sleeve, and wherein the part of the slide that functions as a partition wall includes integrally therewith mutually opposing and foldable side flaps that function as side abutments for the product receivable on one side of the partition wall and also function as further abutment means for the slide in achieving limited maximum withdrawal of the slide from the sleeve.

2. The package assembly of claim 1, wherein the slide first flap that functions as the bottom abutment is created by cut-outs in two adjacent panels and the bottom part of the first flap is comprised of two mutually parallel and mutually spaced fold lines, the space between said fold lines forming said bottom abutment.

3. The package assembly of claim 1, wherein free parts of the first flap on the folded slide are essentially in abutment with a front side of the partition wall and a bottom free end of the partition wall is situated between a rear surface of the first flap and the slide panel.

4. The package assembly of claim 1, wherein a slide panel that functions as an intermediate wall is generally circular in shape.

5. The package assembly of claim 1, wherein the slide is adapted to receive at least one product, said product is insertable into the sleeve and withdrawable therefrom to only a limited maximum extent, and wherein the sleeve has in a region of its opening the inwardly folded second flap that is adapted to coact with the slide first flap that functions as a bottom abutment surface for the product to prevent the complete withdrawal of the slide from the sleeve.

6. The package assembly of claim 5, wherein the sleeve second flap is frusto-conical in shape and has sloping edges and said sloping edges with said side flaps, said side flaps flanking the first flap.

7. The package assembly of claim 5, wherein the folded second flap on the sleeve has a frusto-conical configuration.

8. The package assembly of claim 1, wherein the sleeve and the slide are so configured and shaped and have such thickness as to enable printed information to be applied to both the side surfaces and edge surfaces.

9. The package assembly of claim 1, wherein the slide has a foldable cover having a bottom part which forms a part that lies flush with the sleeve opening after folding the cover and with the slide fully inserted into the sleeve.

10. The package assembly of claim 1, wherein the part of the slide that functions as said partition wall includes integrally therewith mutually opposing and foldable side flaps that function as side abutments for the product receivable on one side of the partition wall and also functions as further abutment means for the slide in achieving limited maximum withdrawal of the slide from the sleeve; wherein the first flap that functions as a bottom abutment is created by cut-outs in two adjacent panels and the bottom part of the first flap is comprised of two mutually parallel and mutually spaced fold lines located in the panel, wherein the space between said fold lines forms said bottom abutment; wherein the free parts of the first flap on the folded slide are essentially in abutment with the front side of the partition wall and a bottom free end of the partition wall is situated between the rear surface of the flat and the slide panel; wherein the slide panel that functions as an intermediate wall is generally circular in shape; wherein the slide has a foldable cover having a bottom part which forms a part that lies flush with the sleeve opening after folding the cover and with the slide fully inserted into the sleeve; wherein the sleeve has in the region of its opening an inwardly folded second flap that is adapted to coact with the slide first flap that functions as a bottom abutment surface for a product, in a manner such as to prevent the complete withdrawal of the slide from the sleeve; wherein the sleeve second flap is frusto-conical in shape and its sloping edges coact with side flaps that flank the first flap; wherein the folded second flap on the sleeve has a frusto-conical configuration; and wherein the sleeve and the slide are so configured and shaped and have such thickness as to enable printed information to be applied to both side surfaces and edge surfaces.

\* \* \* \* \*